E. W. WHITEMAN.
Cotton-Bale Ties.
No. 147,883. Patented Feb. 24, 1874.
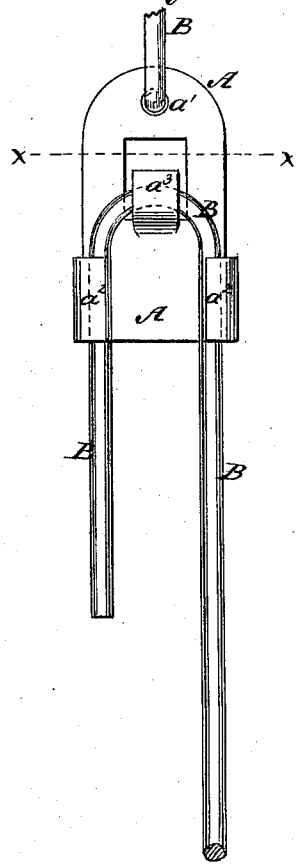
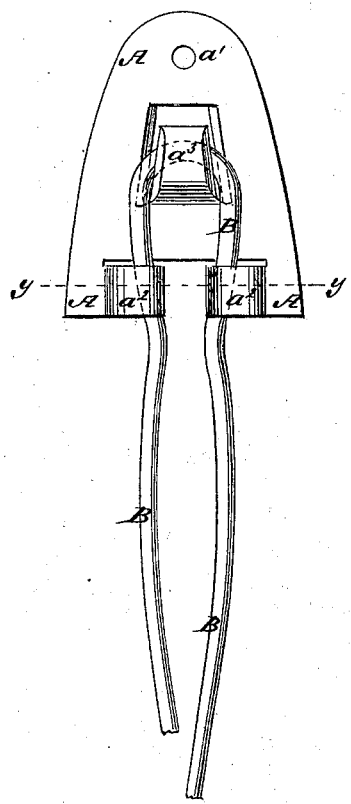
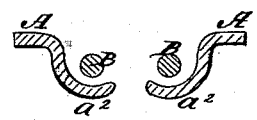
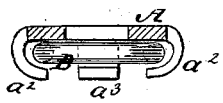
Witnesses:
Inventor:
E. W. Whiteman
Per
Attorneys.

UNITED STATES PATENT OFFICE.

EDWIN W. WHITEMAN, OF BAYOU SARA, LOUISIANA.

IMPROVEMENT IN COTTON-BALE TIES.

Specification forming part of Letters Patent No. 147,883, dated February 24, 1874; application filed January 24, 1874.

*To all whom it may concern:*

Be it known that I, EDWIN W. WHITEMAN, of Bayou Sara, in the parish of West Feliciana and State of Louisiana, have invented a new and useful Improvement in Bale-Tie, of which the following is a specification:

Figure 1 is a plan view of my improved bale-tie, showing the arrangement of the wire. Fig. 2 is a detail cross-section of the same, taken through the line $x\,x$, Fig. 1. Fig. 3 is a plan view of a modified form of the same. Fig. 4 is a detail cross-section, taken through the line $y\,y$, Fig. 3.

Similar letters of reference indicate corresponding parts.

My invention has for its object to furnish an improved tie for bales of cotton and other substances, which shall be simple in construction, inexpensive in manufacture, and convenient in use; shall be capable of being used any number of times, will allow the slack to be easily taken up, may be readily detached, and at the same time will hold the bale securely. The invention consists in an improved bale-tie made with a hole in one end, loops or bends upon its other end, and with a tongue on its middle part, to adapt it to be used with a wire, as hereinafter fully described.

A represents the tie, which is made of sheet metal cut into the proper form and bent into the proper shape. In one end of the tie A is formed a hole, $a^1$, to receive a hook, loop, or eye formed upon one end of the wire B. Upon the other end of the tie A, either upon its side edges, as shown in Figs. 1 and 2, or in the middle part of said end, as shown in Figs. 3 and 4, are formed loops or bends $a^2$, and in its middle part, toward its perforated end, is formed a tongue, $a^3$, which is cut out of the solid body of the tie, and is then bent into hook form.

In using the tie, the wire B is passed around the bale, is passed through one of the loops $a^2$, is bent round the tongue $a^3$, and is sprung into the other loop $a^2$. When the bale-tie has been put under the compress, the end of the wire B is sprung out of the loop $a^2$ and tongue $a^3$, the slack is taken up, the wire is again passed around the tongue $a^3$ and sprung into the loop $a^2$, and its end, which is now long, is passed beneath the adjacent ties.

The perforated end of the tie A may be rounded, as shown in Fig. 1, if desired.

Galvanized wire may be used, which prevents it from rusting and rotting the bagging.

Having thus described my invention, I claim as new, and desire to secure by Letters Patent—

An improved bale-tie, A, made with a hole, $a^1$, in one end, loops or bends $a^2$ upon its other end, and with a tongue, $a^3$, in its middle part, to adapt it to be used with a wire, B, substantially as herein shown and described.

EDWIN W. WHITEMAN.

Witnesses:
F. E. POWELL,
AARON MADERA.